May 16, 1967  C. A. MILLER, JR., ET AL  3,319,793
CORD WOUND FILTER ELEMENT
Filed June 8, 1965  2 Sheets-Sheet 1
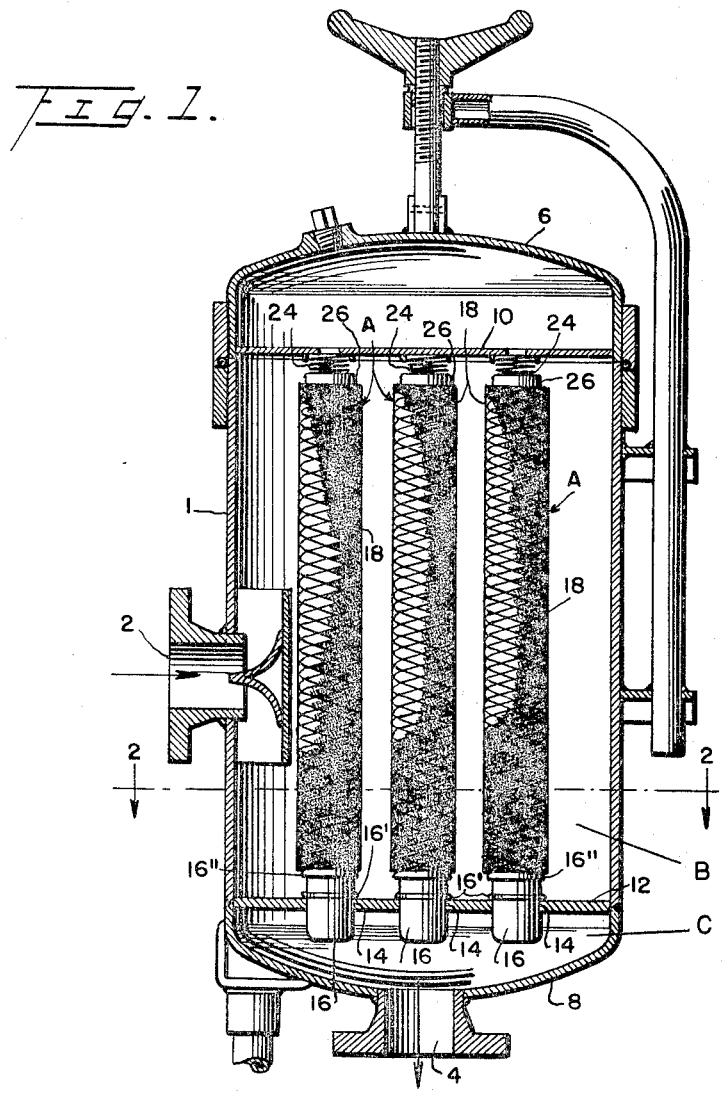
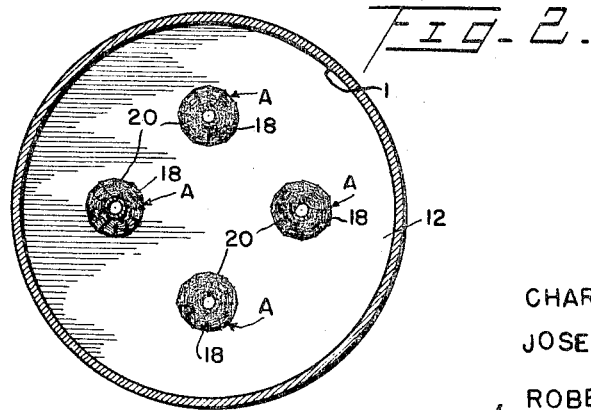
INVENTORS
CHARLES A. MILLER JR.
JOSEPH B. MASASCHI
ROBERT W. MILLER, JR.
BY: *[signature]* ATTORNEY May 16, 1967  C. A. MILLER, JR., ET AL  3,319,793
CORD WOUND FILTER ELEMENT
Filed June 8, 1965  2 Sheets-Sheet 2
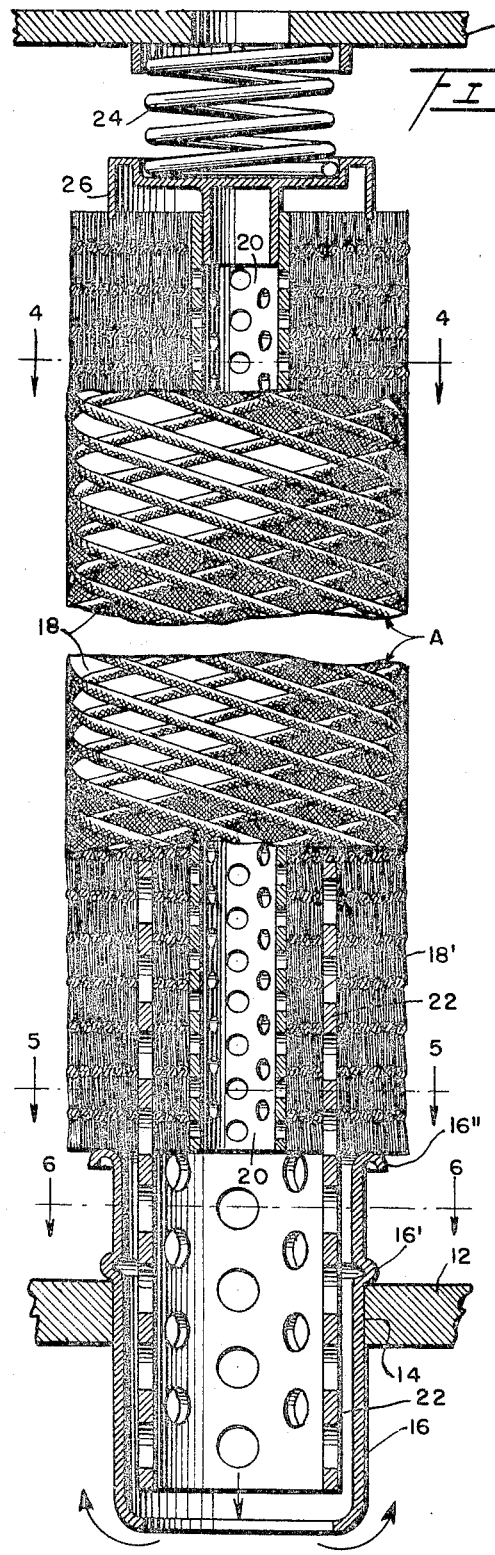
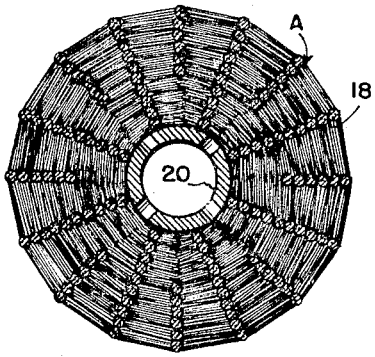
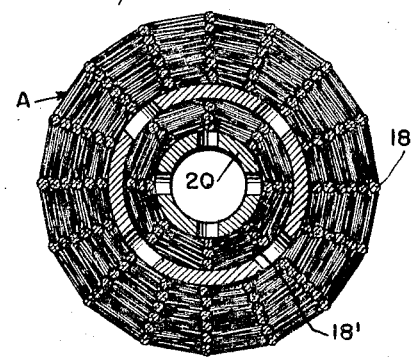
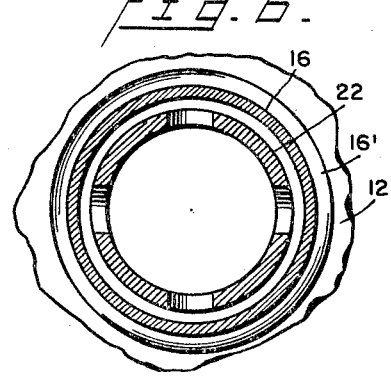
*INVENTORS*
CHARLES A. MILLER JR.
JOSEPH B. MASASCHI
ROBERT W. MILLER, JR.
BY: *Sweeley Hersh* ATTORNEY

United States Patent Office 3,319,793
Patented May 16, 1967

3,319,793
CORD WOUND FILTER ELEMENT
Charles A. Miller, Jr., 4302 N. Charles St., Baltimore, Md. 21218; Joseph B. Masaschi, Baltimore County, Md. (112 Shetland Hills Drive, Lutherville, Md. 21093); and Robert W., Miller, Jr., Baltimore County, Md. (1219 Wine Spring Lane, Towson, Md. 21204)
Filed June 8, 1965, Ser. No. 462,364
2 Claims. (Cl. 210—243)

The present invention relates to an improved fluid filter element and unit therefor, and in particular to the arrangement of the lower end of the filter element and its adaption to the filter unit.

The principal object of the invention is to provide means for increasing the efficiency of the filter, particularly by reducing the resistance to the flow of the fluid at the exhaust end of the filter element.

Another object of the invention is to provide a filter element of the type referred to, in which the structure of the element is simple and economical to manufacture.

Another object of the invention is to provide a structure that will insulate the top and bottom positioning plates for the filter elements when the core of the filter element is constructed of an electrical conductive material.

Another object of the invention is to provide a larger base for the filter element within the separator plate for giving the filter element a firmer foundation, particularly when the fluid being filtered is of heavy viscosity.

While several objects of the invention have been pointed out, other objects, uses and advantages will become more apparent as the nature of the invention is more fully described, the same consisting in its novel construction, combination and arrangement of its several parts shown in the accompanying drawing and described in the detailed description.

In the drawings:

FIGURE 1 is a vertical sectional view of a filter unit showing its filter elements in elevation.

FIGURE 2 is a cross-sectional view taken on the line 2—2 of FIGURE 1.

FIGURE 3 is a view of the filter element partly in section and partly in elevation.

FIGURE 4 is a sectional view taken on the line 4—4 of FIGURE 3.

FIGURE 5 is a sectional view taken on the line 5—5 of FIGURE 3.

FIGURE 6 is a sectional view taken on the line 6—6 of FIGURE 3.

In referring to the drawings like reference characters are used to designate like and similar parts throughout the several views.

The invention lies primarily in the filter element A. These filter elements are carried within a unit housing 1. The housing is provided with an inlet 2 and an outlet 4, and the housing is also provided with a top 6 and a bottom 8. The top 6 is removable for installing and exchanging the filter elements. Extending across the housing adjacent the top is a plate 10 having means associated therewith for supporting one end of the filter element. Also across the housing adjacent the bottom is a septum, or separation plate 12 upon which the opposite end of the filter element is supported and divides the housing into two separate chambers B and C. Extending through the septum plate are a plurality of openings 14, one for each of the filter elements in the unit. Within each of the openings 14 is a septum seat thimble 16 extending partly above the separation plate 12 and partly below. The open end of the seat thimble is held in position by an external ring 16'.

The present filter element consists basically of a helically wound cord 18 wound about a rigid core 20 usually constructed of metal. However, the core is not limited to metal, but may be constructed of any suitable material such as plastic, ceramics, etc. The core runs continuously from end to end of the filter element A.

Extending partly within and partly without one end of the filter element and axially positioned relative to the core, is preferably a perforated filter extension element 22 extending partly into the filter winding 18 and partly without the end of the windings, as best shown in FIGURE 3. The extension element 22 is formed preferably from a rigid material and may be of the same material as the core, or it may be of any other suitable material and in any preferred cross-sectional shape. The element 22 may also be constructed of an insulating material, such as fiberglass, plaster, etc. The extension member 22 is of a larger diameter than the core 20, which provides greater capacity for the flow of the fluid leaving the filter element than the capacity of the core. The element 22 is also insulated from the core 20 by the spiral wrapping of the fiber cord making up the filtering segment of the filtering element.

The filter tube element A may be of any predetermined length and is designed to fit into a particular type unit. In the present unit the top of the filter tube element is held downwardly by the compression spring 24 extending between the top and the separator plate 12. The bottom of the filter element rests on the upper edge 16″ of the septum seat thimble 16. The element 26 beneath the compression spring 24 and the upper edge 16″ of the septum seat thimble 16 seal off the core 20 of the filter element A at each end directing the material to be filtered through the cord windings 18 of the filter element to the perforated core 20 and out through the enlarged extension member 22 below the septum plate 12.

The enlarged area immediately adjacent the outlet end of the core 20 relieves any back pressure of the flowing filtered fluid that may be coming through the core and increasing the efficiency of the filter element, and at the same time provides a better support for the filter element, particularly when the fluid being filtered is moving at high velocity.

By making the opening 14 in the separation plate 12 and the seat thimble 16 of greater diameter, it is necessary to have the member 22 extending into the seat thimble of a larger diameter to provide a neat fit.

With this type of construction the filter elements are operated to a much greater capacity than if only the core 20 were extended beyond the lower end of the filter element windings and through the septum plate 12, which would be a much smaller opening and would be of substantially less capcaity than by the use of the enlarged openings and the seat thimble 16 and the enlarged extension member 22.

While a specific form of the invention has been shown and described, it is not intended as a limitation, and the scope of the invention is best defined in the appended claims.

We claim:

1. A filter unit including a closed chamber having a fluid inlet and a fluid outlet opening and a separation plate adjacent one end of the chamber wherein, the fluid inlet and fluid outlet openings are on opposite sides of the separation plate, comprising:
   (a) a cord wound filter tube having a perforated rigid hollow core extending throughout the entire length of the wound filter tube,
   (b) an extension tube of substantially larger diameter than the core and positioned in the wound body of the filter tube and a part extending beyond one end of the filter tube, the portion of the extension tube extending within the filter tube surrounding the said core and spaced outwardly from the sidewall of the core by a plurality of cord windings and a plurality of cord windings extending over the outer surface of the section of the extension member positioned within the filter tube, (c) a hollow seat thimble of such diameter as to outwardly telescope the end of the extension member extending beyond the end of the filter tube, said seat thimble positioned within an opening in the separation plate and receiving said extension member for supporting the filter tube on the separation plate.

2. A filter tube for a filter unit comprising:

(a) a cord wound filter tube having a perforated rigid core extending throughout the entire length of the filter tube, (b) a tubular extension constructed of insulating material and of substantially larger diameter than the core having a part positioned in the wound body of the filter tube and a part extending outwardly beyond one end of the filter tube, the portion of the tubular extension extending within the filter tube surrounding the said core and spaced radially outwardly from the sidewalls of the core by a plurality of cord windings and a plurality of cord wrapping extending over the outer surface of the section of the tubular extension positioned within the filter tube.

References Cited by the Examiner

UNITED STATES PATENTS

| 2,502,545 | 4/1950 | Wellborn | 210—494 X |
| 3,027,009 | 3/1962 | Price | 210—236 |
| 3,042,216 | 7/1962 | Goldman | 210—494 |

REUBEN FRIEDMAN, *Primary Examiner.*

F. SPEAR, *Assistant Examiner.*